United States Patent
Hiraguchi

(10) Patent No.: US 7,114,672 B2
(45) Date of Patent: Oct. 3, 2006

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 84 days.

(21) Appl. No.: 10/392,078

(22) Filed: Mar. 20, 2003

(65) Prior Publication Data
US 2003/0183715 A1 Oct. 2, 2003

(30) Foreign Application Priority Data
Mar. 29, 2002 (JP) ............................. 2002-097573

(51) Int. Cl.
G03B 23/02 (2006.01)
G11B 23/08 (2006.01)

(52) U.S. Cl. ..................... 242/348; 242/357; 360/132

(58) Field of Classification Search ................ 242/348, 242/357; 360/132
See application file for complete search history.

(56) References Cited

U.S. PATENT DOCUMENTS

| 5,218,342 | A | * | 6/1993 | McCrackin | .............. 340/572.8 |
| 5,610,789 | A | * | 3/1997 | Miller | ........................ 360/132 |
| 6,304,416 | B1 | * | 10/2001 | McAllister et al. | ......... 360/132 |
| 6,452,745 | B1 | | 9/2002 | Shiga et al. | |
| 6,481,658 | B1 | * | 11/2002 | Shiga et al. | ................. 242/347 |
| 6,577,471 | B1 | * | 6/2003 | Morita et al. | ............... 360/132 |
| 6,702,215 | B1 | * | 3/2004 | Stamm et al. | .............. 242/348 |

* cited by examiner

Primary Examiner—Kathy Matecki
Assistant Examiner—E. Langdon
(74) Attorney, Agent, or Firm—Sughrue Mion, PLLC

(57) ABSTRACT

A case of a recording tape cartridge, which accommodates a reel on which a recording tape is wound, has a substantially rectangular opening at a rear end wall which is at a rear side in a direction of loading the recording tape cartridge into a drive device. A block, which is equipped with a memory on which various types of information such as a recording capacity and the like are stored, is fit into and mounted to the opening. The memory is mounted to the block so as to be inclined at substantially 45° with respect to a rear surface and a bottom surface of the case. The block can be attached to and removed from the case. Access to the memory in order to read and write information from and onto the memory is possible from the rear and from beneath.

19 Claims, 8 Drawing Sheets

RECORDING TAPE CARTRIDGE

BACKGROUND OF THE INVENTION

1. Field of the Invention

The present invention relates to a recording tape cartridge accommodating, within a case, a single reel on which is wound a recording tape such as a magnetic tape used as a recording medium mainly for computers or the like.

2. Description of the Related Art

Conventionally, magnetic tape cartridges are known which accommodate, within a case, a single reel on which is wound a magnetic tape which is used as a data recording medium for computers or the like. A leader member, which is a leader block, a leader pin or a leader tape, is provided at the distal end of the magnetic tape. A pull-out means provided at a drive device pulls the leader member out from the magnetic tape cartridge, and winds the magnetic tape, which is fixed to the leader member, on a take-up reel of the drive device.

A reel gear is formed in an annular shape at the center of the bottom surface of the reel which emerges from a hole formed in the bottom surface of the magnetic tape cartridge. Due to a driving gear provided at a rotating shaft of the drive device meshing with the reel gear, the reel is driven to rotate. By rotating the reel of the magnetic tape cartridge and the take-up reel of the drive device synchronously, data can be recorded onto the magnetic tape or data recorded on the magnetic tape can be played back (read out).

Usually, a large number of such magnetic tape cartridges are accommodated and stored in an accommodating rack called a library. The rear end sides of both side walls of a desired magnetic tape cartridge are grasped by a grasping means having a robot hand or the like, and the desired magnetic tape cartridge is removed from an accommodating portion of the library. By loading the magnetic tape cartridge as is into one of a plurality of drive devices, data is recorded in the magnetic tape cartridge, or data recorded in the magnetic tape cartridge is played back.

A card-like memory board, which stores various types of information such as the recording capacity, the recording format and the like of a magnetic tape cartridge, is provided at the inner side of the rear wall of the magnetic tape cartridge, in order for the magnetic tape cartridge which has been removed from the library to be smoothly loaded into one of the drive devices. Namely, the various types of information stored on the memory board are read by a reading device provided at the robot hand or by a reading/writing device provided at the drive device. The drive device, which can record data into that magnetic tape cartridge or which can playback (read out) recorded data from that magnetic tape cartridge, is recognized in advance by a control device or the like such that there is no loss in the operation of the grasping means such as a robot hand or the like.

A conventional magnetic tape cartridge 150 is illustrated in FIG. 8. In FIG. 8, the direction of arrow P is the front direction. As shown in FIG. 8, a memory board 144 is disposed so as to be inclined by a predetermined angle at the inner side of a rear wall 152 of the magnetic tape cartridge 150. Because the robot hand is structured to grip portions near the rear ends of the left and right side walls of the magnetic tape cartridge 150, a reading device 140 accesses the memory board 144 from the rear surface (rear wall 152) side of the magnetic tape cartridge 150. Due to a bucket (see FIG. 7) being lowered, the magnetic tape cartridge 150 which is loaded in a drive device is completely loaded within the drive device. Thus, a reading/writing device 142 accesses the memory board 144 from a bottom surface 154 side of the magnetic tape cartridge 150.

Accordingly, the memory board 144 is disposed at an angle of elevation of 45°, as seen in side view, in order to be able to be accessed from two directions which are from the rear surface (rear wall 152) side and from the bottom surface 154 side. When the memory board 144 is disposed in such a position, the memory board 144 can be accessed (read) by electromagnetic waves transmitted and received from and by the reading device 140 which is disposed at the rear surface (the rear wall 152) side. Further, the memory board 144 can be accessed (read and written) by electromagnetic waves transmitted and received from and by the reading/writing device 142 which is disposed at the bottom surface 154 side. Note that the reading/writing device 142 is a device which can carry out not only reading of information, but writing of information as well. However, depending on the drive device, there are cases in which only the reading device 140 is provided.

In any case, because the memory board 144 can be accessed in a non-contact manner, it is provided within the case. Namely, the case of the magnetic tape cartridge 150 is assembled by, after the memory board 144 has been provided at the interior, joining an upper case 146 and a lower case 148 by attaching screws, ultrasonic welding, or the like.

However, with such a structure, when the magnetic tape cartridge is to be disposed of, if even only the memory board is to be removed from the case for recycling, a problem arises in that the memory board cannot be easily removed. Namely, in order to remove the memory board, the case of the magnetic tape cartridge must be disassembled. In particular, when the case is assembled by joining the upper case and the lower case by ultrasonic welding or the like, the memory board cannot be removed unless the case is destroyed. Thus, the operation for removing the memory board is extremely troublesome.

SUMMARY OF THE INVENTION

An object of the present invention is to provide a recording tape cartridge in which a memory can be easily removed from or mounted to a case, without disassembling or destroying the case.

In order to achieve this object, one aspect of the present invention is a recording tape cartridge accommodating a recording tape, and loaded into a drive device from a predetermined direction, said recording tape capable of performing at least one of recording of information onto the recording tape and reading of information from the recording tape, said recording tape cartridge comprising: a case accommodating the recording tape in an interior of the case; a memory for recording of predetermined types of information, said memory being capable of communicating information between the memory and an exterior of the case; and a block holding the memory, said block being detachably mounted to the case.

The predetermined types of information include at least one of a recording capacity and a recording format of the cartridge.

In this way, when the block, to which the memory is mounted, is structured so as to be detachably mounted to the case, the memory can be easily mounted and removed by mounting and removing the block without disassembling or destroying the case. Accordingly, when considering the ability to recycle the magnetic tape cartridge, the ability to reuse the memory can easily be improved.

DESCRIPTION OF THE PREFERRED EMBODIMENTS

Hereinafter, embodiments of the present invention will be described in detail on the basis of the figures. For convenience of explanation, the direction of loading the recording tape cartridge into the drive device (the direction of arrow P in FIG. 1) is referred to as the front direction, and the front, back, left, right, up and down directions are expressed by using the front direction as the reference. Further, a magnetic tape is used as the recording tape, and hereinafter, a magnetic tape cartridge will be described.

Figure 1:
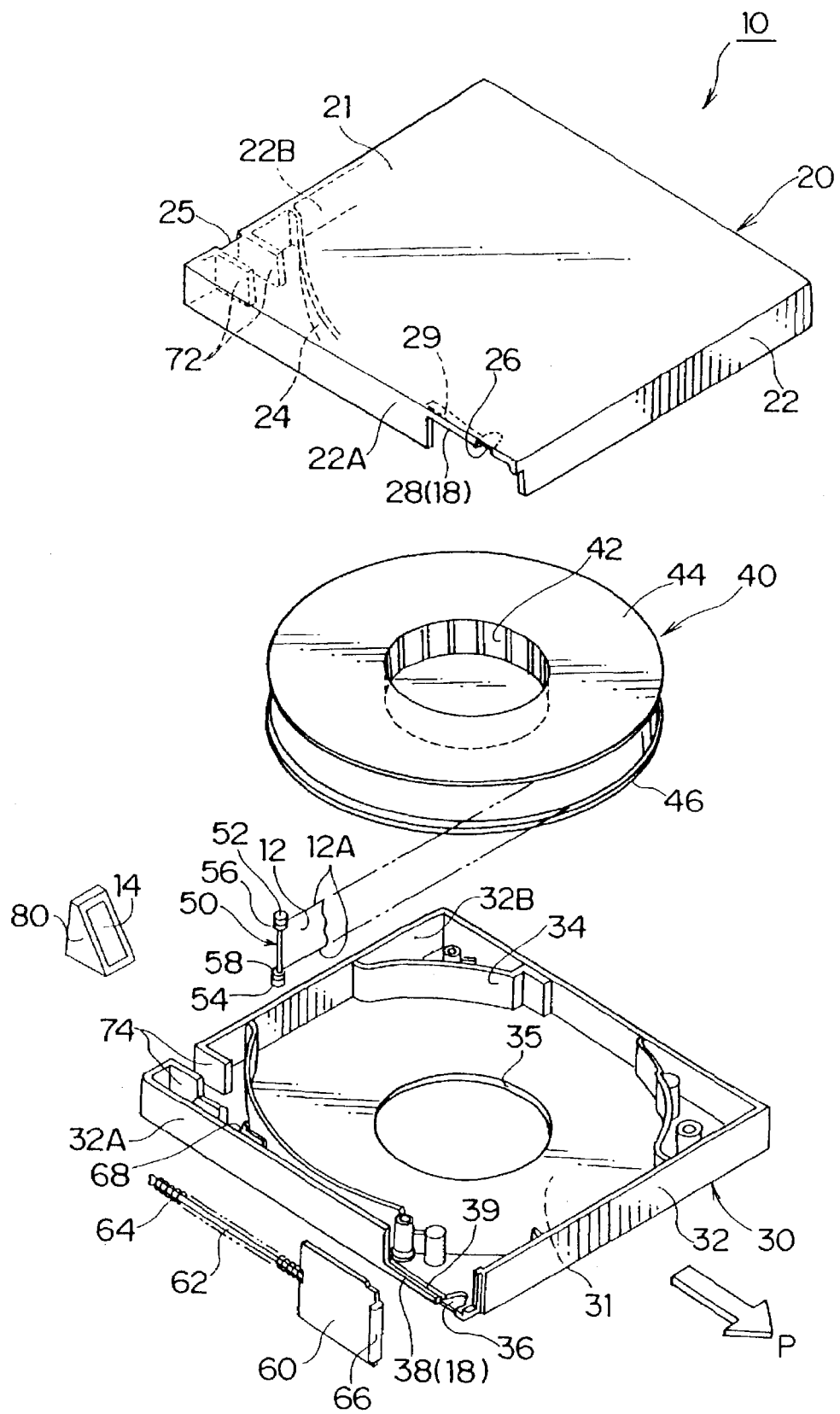
FIG. 1 is a schematic exploded perspective view of a magnetic tape cartridge relating to the present invention.

As shown in FIG. 1, a magnetic tape cartridge 10 is formed in a substantially rectangular box shape by an upper case 20 and a lower case 30, which are made of a synthetic resin, being joined together by ultrasonic welding or screws or the like in a state in which peripheral walls 22, 32 thereof abut one another. A single reel 40, on which is wound a magnetic tape 12 serving as an information recording medium, is rotatably accommodated at the interior of the magnetic tape cartridge 10. Namely, play restricting walls 24, 34, which form portions of substantially cylindrical walls, stand upright at the inner surfaces of the upper case 20 and the lower case 30, respectively, and the reel 40 is accommodated at the inner portions of the play restricting walls 24, 34.

Figure 8:
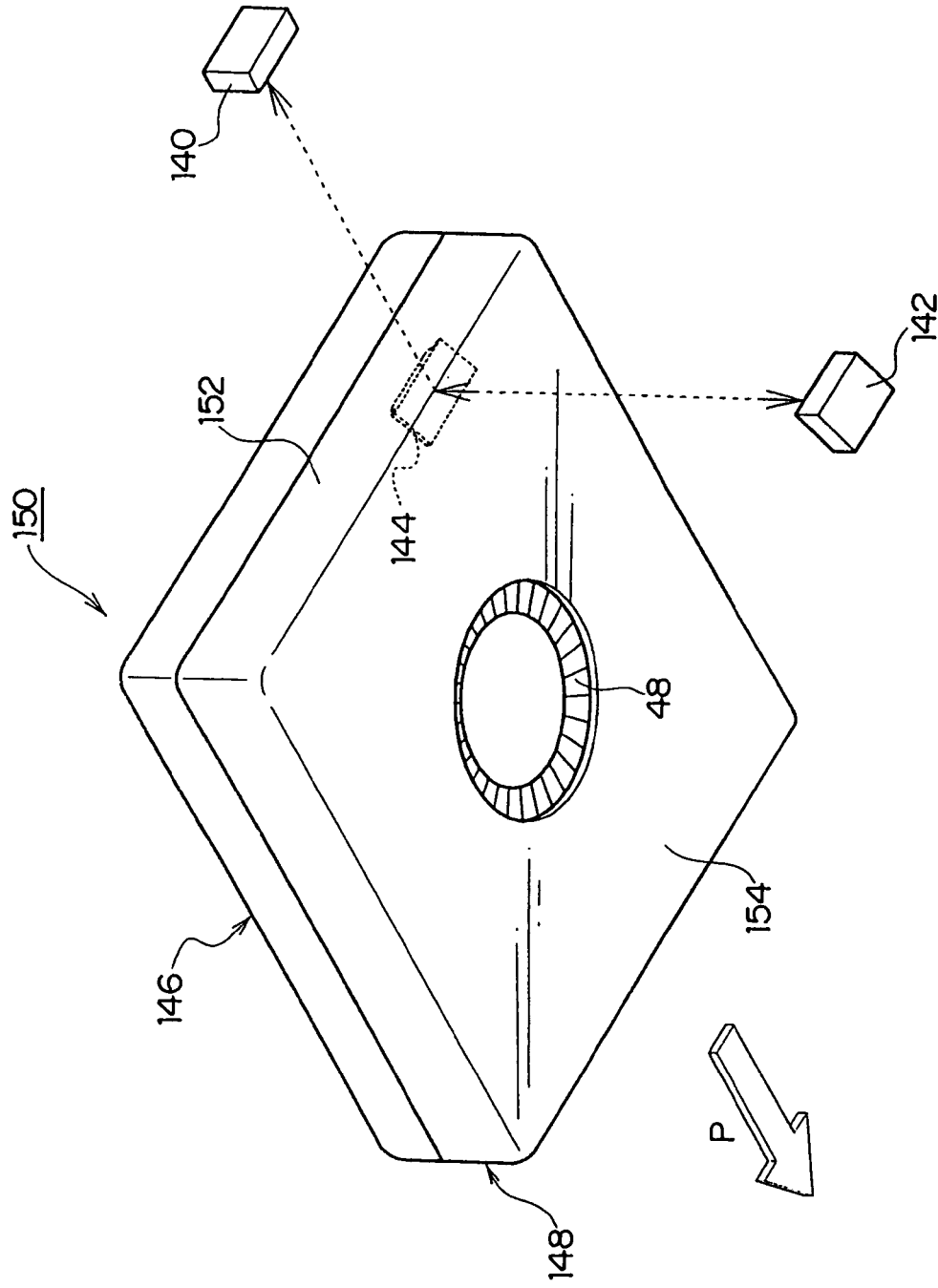
FIG. 8 is a schematic perspective view of a conventional magnetic tape cartridge.

An open hole 35 which is round is formed at the substantial center of the lower case 30. A reel gear 48 (see FIG. 8), which is formed in a ring shape at the bottom surface of the reel 40, and the like emerge out from the open hole 35. At the reel 40, a cylindrical reel hub 42, and a lower flange portion 46 which projects out in the radial direction from the outer periphery of the bottom end of the reel hub 42, are molded integrally from a synthetic resin. An upper flange portion 44, which has the same configuration as the lower flange portion 46, is joined by ultrasonic welding or the like to the top end of the reel hub 42. Then, the magnetic tape 12 is wound on the outer peripheral surface of the reel hub 42.

Substantially rectangular cut-out portions 28, 38 are formed in right walls 22A, 32A in a vicinity of the front right corner portion of the magnetic tape cartridge 10. An opening 18, which is for pulling the magnetic tape 12 wound on the reel 40 out to the exterior, is formed by the cut-out portions 28, 38. Note that, when the magnetic tape cartridge 10 is not in use, the opening 18 is closed by a shutter member 60 which will be described later. Further, engagement portions 26, 36, which anchor and fix an upper end portion 52 and a lower end portion 54 of a leader pin 50 respectively, are provided at the inner surfaces of the upper case 20 and the lower case 30 in a vicinity of the front right corner portion.

The leader pin 50 is a member which is engaged by a pull-out member (not illustrated) of a drive device 130, in order to pull the magnetic tape 12 out. The leader pin 50 is formed in a substantial dumbbell shape in which upper end portion 52 and the lower end portion 54 are formed to protrude with larger diameters than the central portion of the leader pin 50. The distal end of the magnetic tape 12 is fixed to the central portion of the leader pin 50 by an adhesive or the like. Flanges 56, 58 are provided in vicinities of the upper end portion 52 and the lower end portion 54 of the leader pin 50. Upper and lower edges (side end portions) 12A of the magnetic tape 12 are regulated by the flanges 56, 58, such that the mounting accuracy of the leader pin 50 with respect to the magnetic tape 12 can be ensured.

A shaft 62 having a predetermined length is formed integrally with the shutter member 60 so as to project from the substantial center of the rear end surface of the shutter member 60. A coil spring 64 is wound around the shaft 62. The rear end of the coil spring 64 is anchored on an anchor portion 68 which projects at the inner surface of the lower case 30. The upper and lower side edge portions of the shutter member 60 fit into groove portions 29, 39 formed in the inner surfaces of the upper case 20 and the lower case 30. Accordingly, the shutter member 60 is supported so as to be freely slidable in the front-back direction, in a state in which the shutter member 60 is always urged toward the front by the urging force of the coil spring 64. When the magnetic tape cartridge 10 is not in use, the shutter member 60 closes the opening 18.

An engagement portion 66, which engages with an opening/closing member (not shown) of the drive device 130, is formed integrally with the front end of the shutter member 60 so as to project outwardly. As the magnetic tape cartridge 10 is loaded into the drive device 130, the engagement portion 66 engages with the opening/closing member, and the shutter member 60 is moved rearward against the urging force of the coil spring 64 such that the opening 18 is opened.

Figure 2:
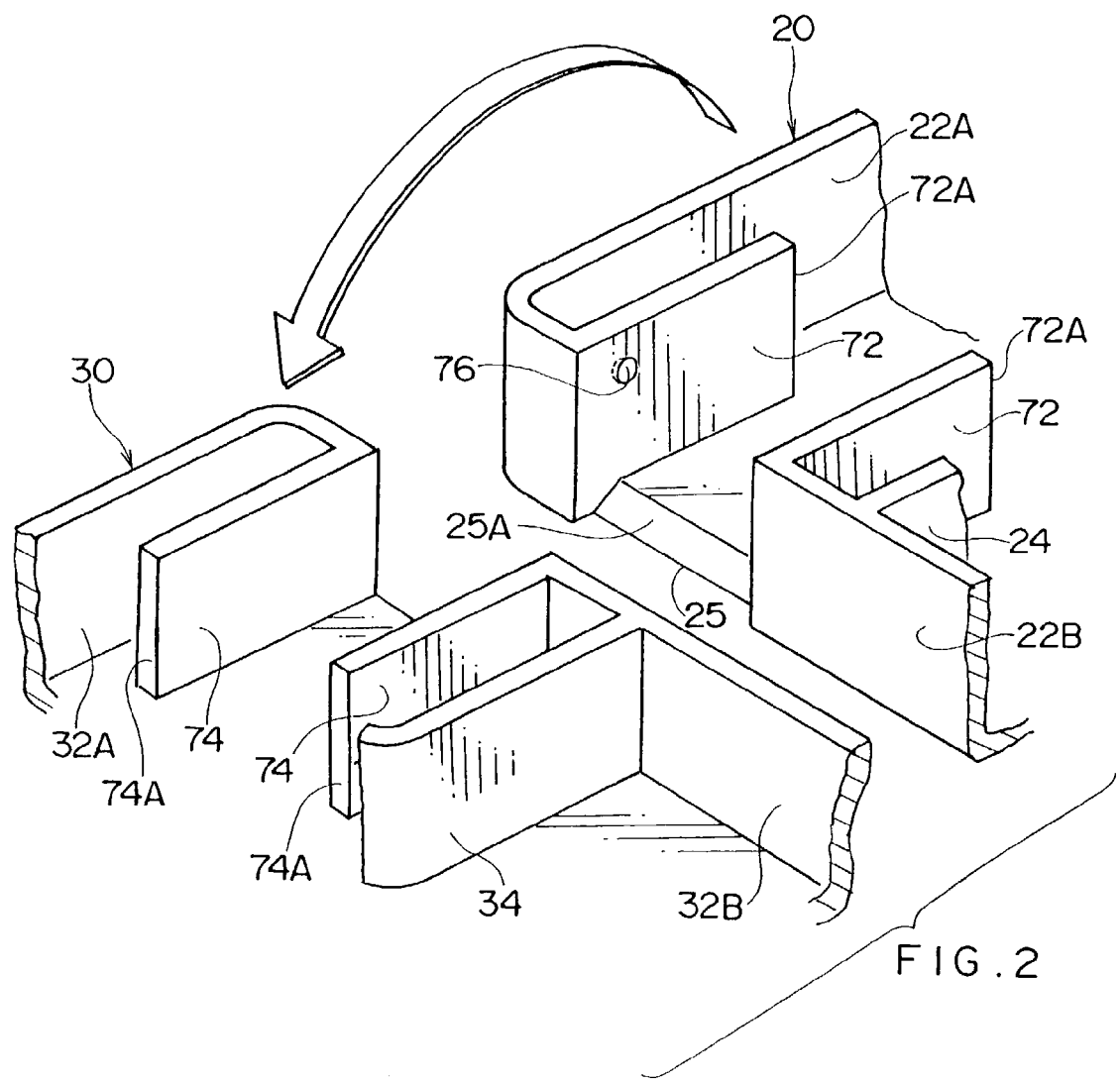
FIG. 2 is an enlarged perspective view of main portions, illustrating an upper case and a lower case of the magnetic tape cartridge.

Further, as shown in FIG. 2, vicinities of the rear right corner portions of rear walls 22B, 32B of the upper case 20 and the lower case 30 are cut out in substantially rectangular shapes as seen in front view. Inner walls 72, 74 of predetermined lengths are formed integrally at the cut-out left and right ends, so as to extend forward and parallel to the right walls 22A, 32A (as well as parallel to the left walls). The portion of a top surface 21 of the upper case between the inner walls 72 is cut-out slightly (to a predetermined width), and an end surface 25A of this cut-out portion 25 is formed as an inclined surface of a predetermined angle. Front end portions 72A, 74A of the inner walls 72, 74 may be open as illustrated. Or, unillustrated wall portions may be provided thereat such that the front wall portions 72A, 74A are closed when the upper case 20 and the lower case 30 are joined together.

Figure 3:
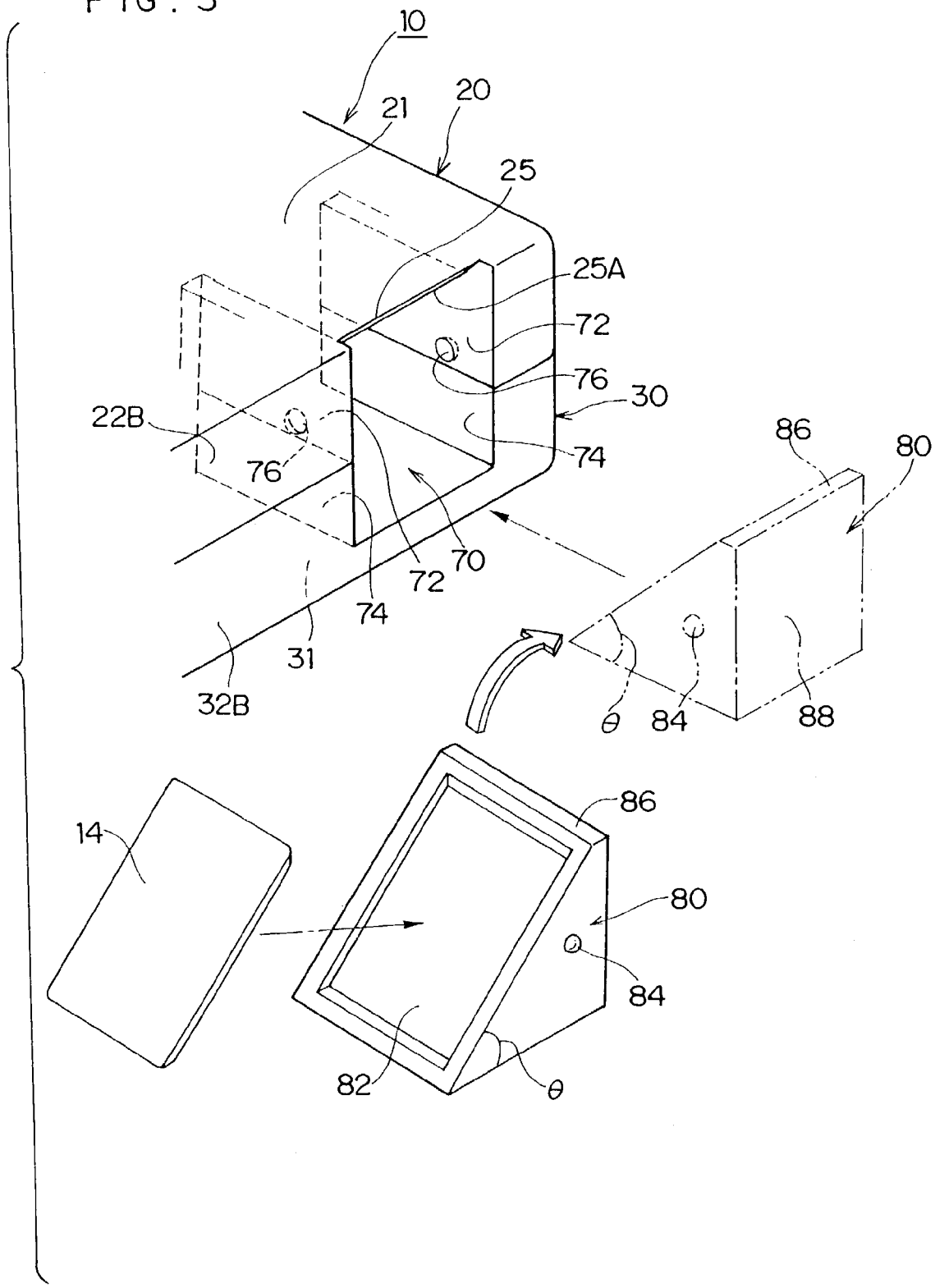
FIG. 3 is a diagram for explanation which illustrates a state in which a block, which is equipped with a memory board, is mounted to a case.

As shown in FIG. 3, a substantially rectangular open hole 70 is formed in the rear walls 22B, 32B. A block 80 equipped with a memory board 14 is fit into and mounted in the open hole 70. The memory board 14 is formed as a substantially rectangular thin plate. Various types of generation information, such as at least the type of the magnetic tape 12, the recording capacity, the recording format, and the like, are electrically stored on the memory board 14. This information can be read in a non-contact manner by electromagnetic waves transmitted and received from and by a reading device 140 and a reading/writing device 142 which will be described later.

The block 80 is formed in a substantially triangular columnar shape as illustrated. The memory board 14 is mounted integrally to a concave portion 82 which is formed in the inclined surface of the block 80 and which is shallow. (The depth of the concave portion 82 is the same as or slightly greater than the thickness of the memory board 14.) Further, convex portions 84, which fit together with concave portions 76 formed at the facing inner walls 72 (or inner walls 74), are formed at the side surfaces of the block 80. A planar portion 86, which is exposed from the cut-out portion 25 of the upper case 20, is formed at the top portion of the block 80. Note that it is also possible to provide convex portions at the inner walls 72 (or the inner walls 74) and concave portions at the block 80.

The angle of elevation θ of the inclined surface to which the memory board 14 is mounted is 45°. The memory board 14 can be accessed from the rear surface (rear walls 22B, 32B) side and from a bottom surface 31 side, in the same way as in the conventional art. The block 80 at which the memory board 14 is mounted is provided so as to close the open hole 70, by being inserted into the open hole 70 with the inclined surface of the block 80 leading and by the convex portions 84 being fit into the concave portions 76. Note that, at this time, the end surface 25A of the cut-out portion 25 is formed as an inclined surface of a predetermined angle, i.e., the same 45° as the inclined surface of the block 80. Therefore, the upper portion of the block 80 suitably abuts the inclined surface 25A of the cut-out portion 25, and the planar portion 86 is fits with and is exposed from the cut-out portion 25.

In this way, the open hole 70 is closed by the block 80, and a rear surface 88 of the block 80 forms a portion of the rear walls 22B, 32B. Note that when the block 80 is to be removed from the rear walls 22B, 32B, it can be simply removed by rearwardly pushing the planar portion 86, which is exposed from the cut-out portion 25, by a finger or the like. In any case, when the memory board 14 and the block 80 are integral, the memory board 14 can be easily mounted and removed by mounting and removing the block 80. Thus, when considering the ability to recycle the magnetic tape cartridge 10, the memory board 14 thereof can easily be reused.

Figure 4:
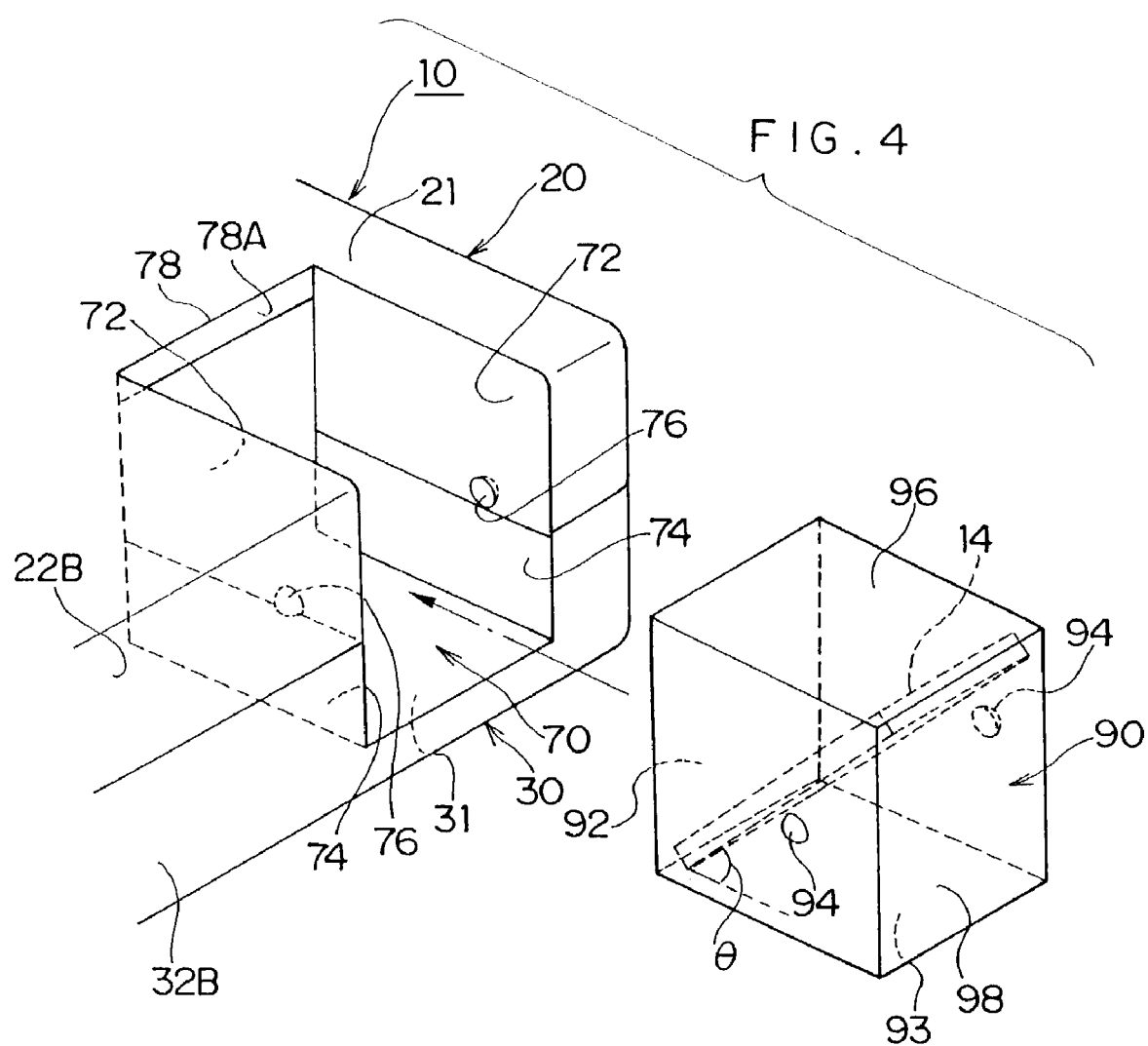
FIG. 4 is a diagram for explanation which illustrates a state in which the block, which is equipped with the memory board, is mounted to the case.

Moreover, a block 90 such as that shown in FIG. 4 may be used. The block 90 is formed as a substantially rectangular parallelepiped whose front-back direction dimension is longer than the left-right direction dimension thereof. The memory board 14 is integrally embedded within the block 90 such that a placement angle θ at which the memory board 14 is set is 45°. In the same way as described above, convex portions 94, which fit together with the concave portions 76 which are provided at the facing inner walls 72 (or inner walls 74), are formed at the both side surfaces of the block 90. In this case as well, it is also possible to provide convex portions at the inner walls 72 (or the inner walls 74) and concave portions at the block 90.

At this time, the portion of the top surface 21 of the upper case 20 between the inner walls 72 is cut-out to the same size as that of a top surface 96 of the block 90. The block 90 can be mounted not only from the side of the rear walls 22B, 32B, but also from the side of the top surface 21 of the upper case 20, or from therebetween. Namely, as shown in FIG. 4, the block 90 is mounted so as to close the open hole 70 by a front surface 92 of the block 90 being inserted in first from the rear walls 22B, 32B side, or by a bottom surface 93 of the block 90 being inserted in first from the top surface 21 side, or by the front surface 92 and the bottom surface 93 being inserted in first from therebetween, and by the upper edge portion of the front surface 92 abutting an end surface 78A of a cut-out portion 78 of the upper case 20, and by the convex portions 94 being fit together with the concave portions 76.

In this way, the top surface 96 of the block 90 forms a uniform surface with the top surface 21 of the upper case 20, and a rear surface 98 of the block 90 forms a uniform surface with the surface of the rear walls 22B, 32B. Accordingly, when the block 90 is to be removed, it can be easily removed by pushing the top surface 96 by a finger or the like toward the rear, or by moving the rear surface 98 upward. The memory board 14 can easily be mounted and removed by mounting and removing the block 90. Thus, when the recording tape cartridge 10 is recycled, the memory board 14 thereof can be reused.

As described above, the memory board 14 is optimally provided integrally with the blocks 80, 90 at an elevation angle θ as seen looking upward from the rear of the cartridge at an angle of inclination of 45° with respect to the horizontal direction. However, the elevation angle θ may be changed provided that it is in a range of 30° to 60° (a range over which reading and writing are possible). Further, there are many cases in which the bottom surface 31 of the lower case 30 is utilized for positioning, such as reference holes for positioning (dimensional reference holes) are provided in the bottom surface 31 or the like. Thus, it is preferable to form the blocks 80, 90 to be freely attachable and removable such that the planarity of the bottom surface 31 is not adversely affected. Moreover, instead of the non-contact type memory board 14, a contact-type memory may be built-into the blocks 80, 90.

Figure 5:
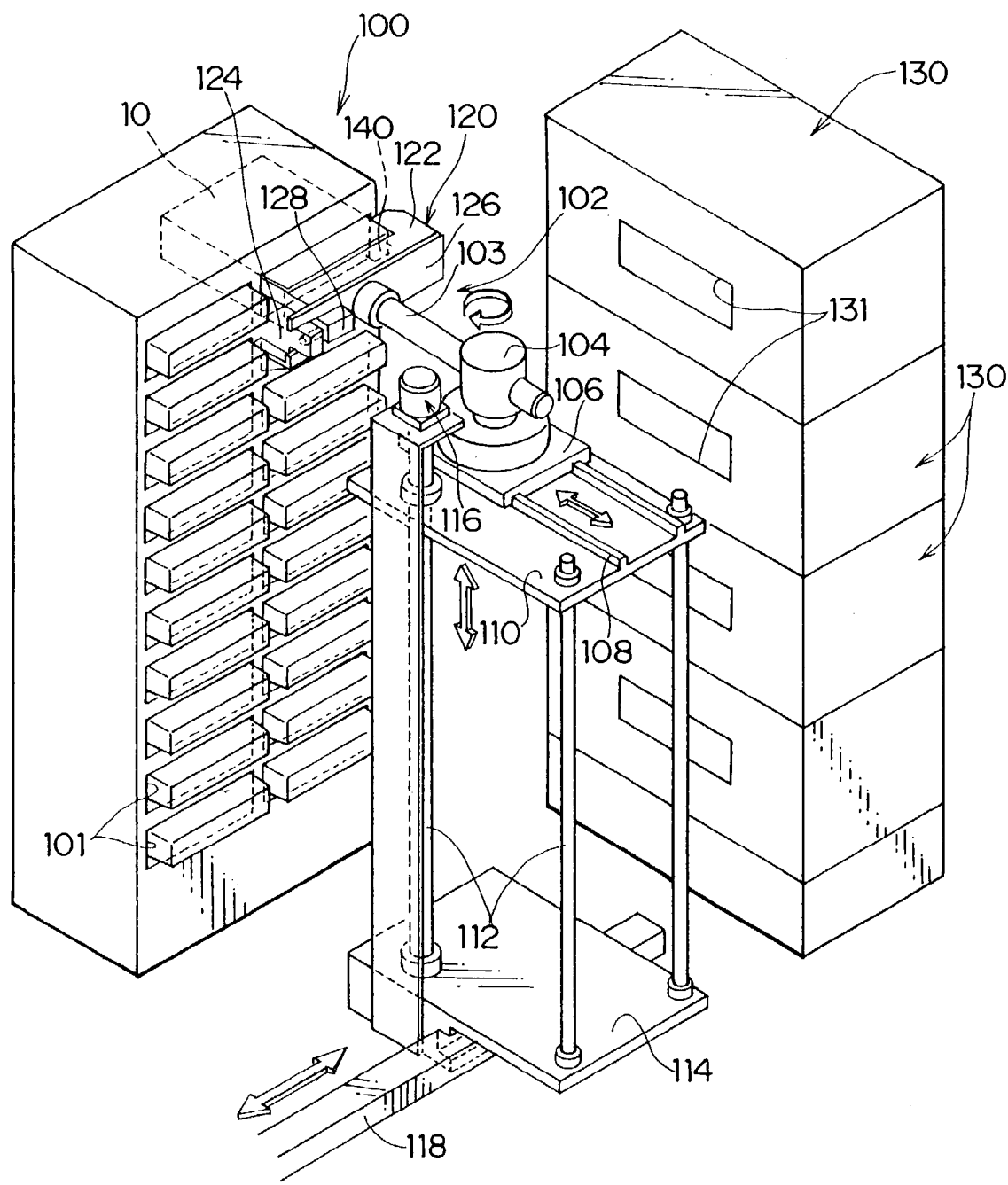
FIG. 5 is a schematic perspective view showing a library and drive devices.
Figure 6:
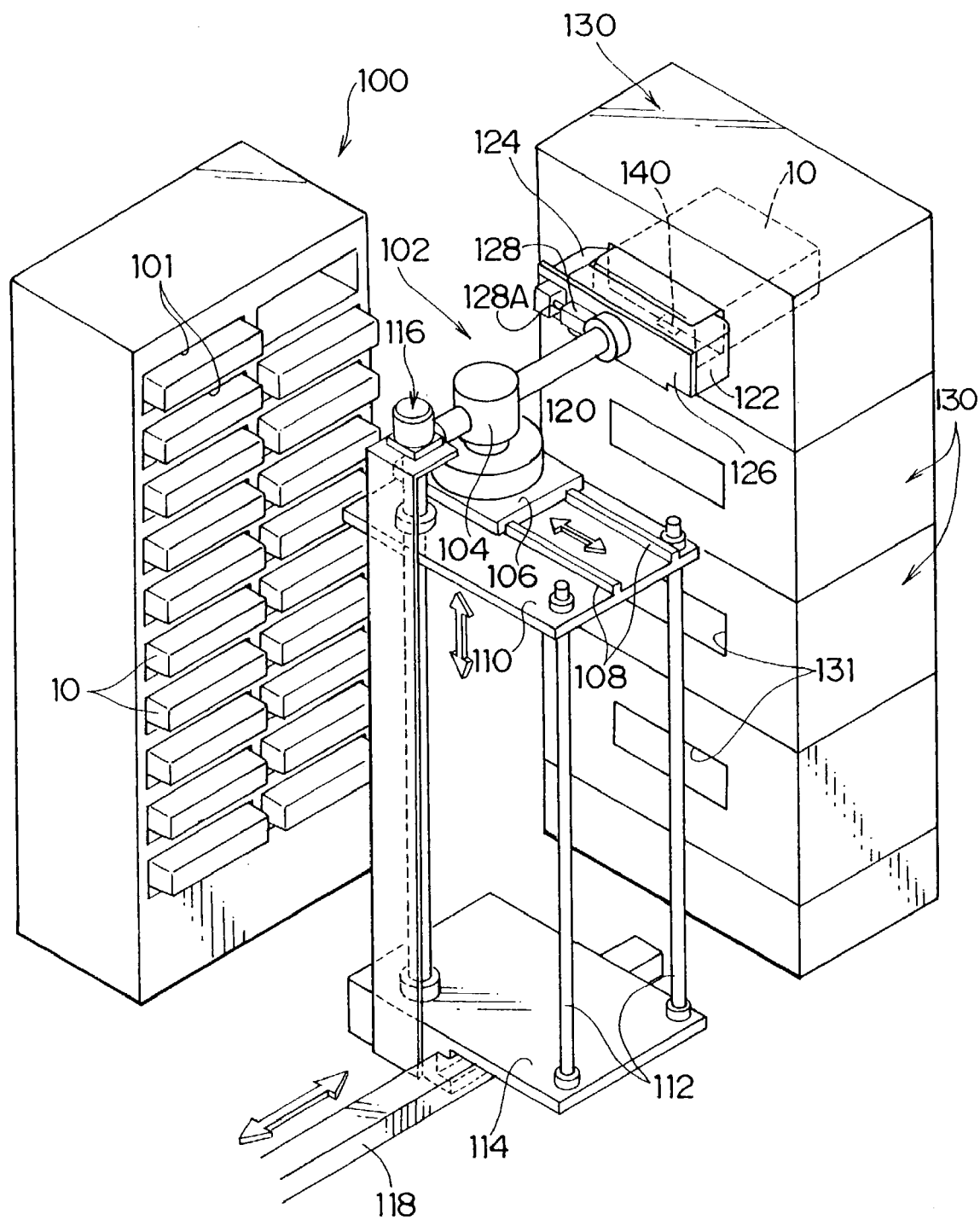
FIG. 6 is a schematic perspective view showing the library and the drive devices.

Next, a library 100, which is provided with the reading device 140 which can access the non-contact type memory board 14, will be described. As shown in FIGS. 5 and 6, a grasping means 102 provided at the library 100 is a means which automatically carries out the work of removing the magnetic tape cartridge 10, which is accommodated in the library 100, from the library 100 and loading it into the drive device 130, and of removing the magnetic tape cartridge 10 from the drive device 130 and returning it to the library 100. The grasping means 102 is structured so as to be able to freely move between the library 100 and the drive devices 130.

Namely, an arm 103, at whose distal end a robot hand 120 is mounted, is fixed to a pivoting device 104, and pivots freely between the library 100 and the drive devices 130. The pivoting device 104 is fixed on a base 106. The base 106 is slidable on rails 108, which are laid out on a supporting stand 110, by an unillustrated driving means.

Driving force from a raising/lowering device 116 is transmitted to the supporting stand 110 such that the supporting stand 110 can rise and fall along guide struts 112 standing erect from a carrier 114. The carrier 114 is movable along a rail 118 which is laid out in a direction orthogonal to the rails 108. Accordingly, the robot hand 120, which is mounted to the distal end of the arm 103, can freely move between respective accommodating portions 101 and respective loading openings 131 of the drive devices 130.

The robot hand 120 is formed in a substantial U shape as seen in plan view. One claw portion 122 thereof is formed and fixed integrally with a support portion 126. Another claw portion 124 is mounted to the distal end of a piston rod 128A of a cylinder 128 mounted to the support portion 126.

Due to the piston rod 128A extending and contracting, the interval between the claw portion 122 and the claw portion 124 is adjusted. Vicinities of the rear ends of the left and right side walls of the magnetic tape cartridge 10 can thereby suitably be nipped (grasped).

Further, the reading device 140, which reads, in a non-contact manner, the various types of information stored on the memory board 14, is provided at the robot hand 120. Namely, the claw portion 122 and the claw portion 124 of the robot hand 120 grasp (nip) vicinities of the rear ends of the left and right side walls of the magnetic tape cartridge 10 from the outer sides thereof. Therefore, the supporting portion 126 faces the rear walls 22B, 32B. The reading device 140 is provided at the right side of the inner surface of the supporting portion 126 and can access the memory board 14 from the rear surface (rear walls 22B, 32B) side of the magnetic tape cartridge 10.

Accordingly, when the robot hand 120 grasps the magnetic tape cartridge 10, the various information, such as the recording capacity and the like, of the magnetic tape cartridge 10 are read by the reading device 140, and this information is transmitted to a control device (not shown). The drive device 130 which is suitable therefor is selected in advance, and the magnetic tape cartridge 10 is smoothly loaded into one of the plural drive devices 130.

Namely, by reading the various information of the respective magnetic tape cartridges 10, which of the drive devices 130 can record and playback the magnetic tape cartridges 10 can be recognized in advance by the control device. Therefore, the movement from the library 100 to the drive devices 130 is carried out smoothly, and the time until the data writing start time (the access start time) can be shortened, and the data processing efficiency can be improved.

Figure 7:
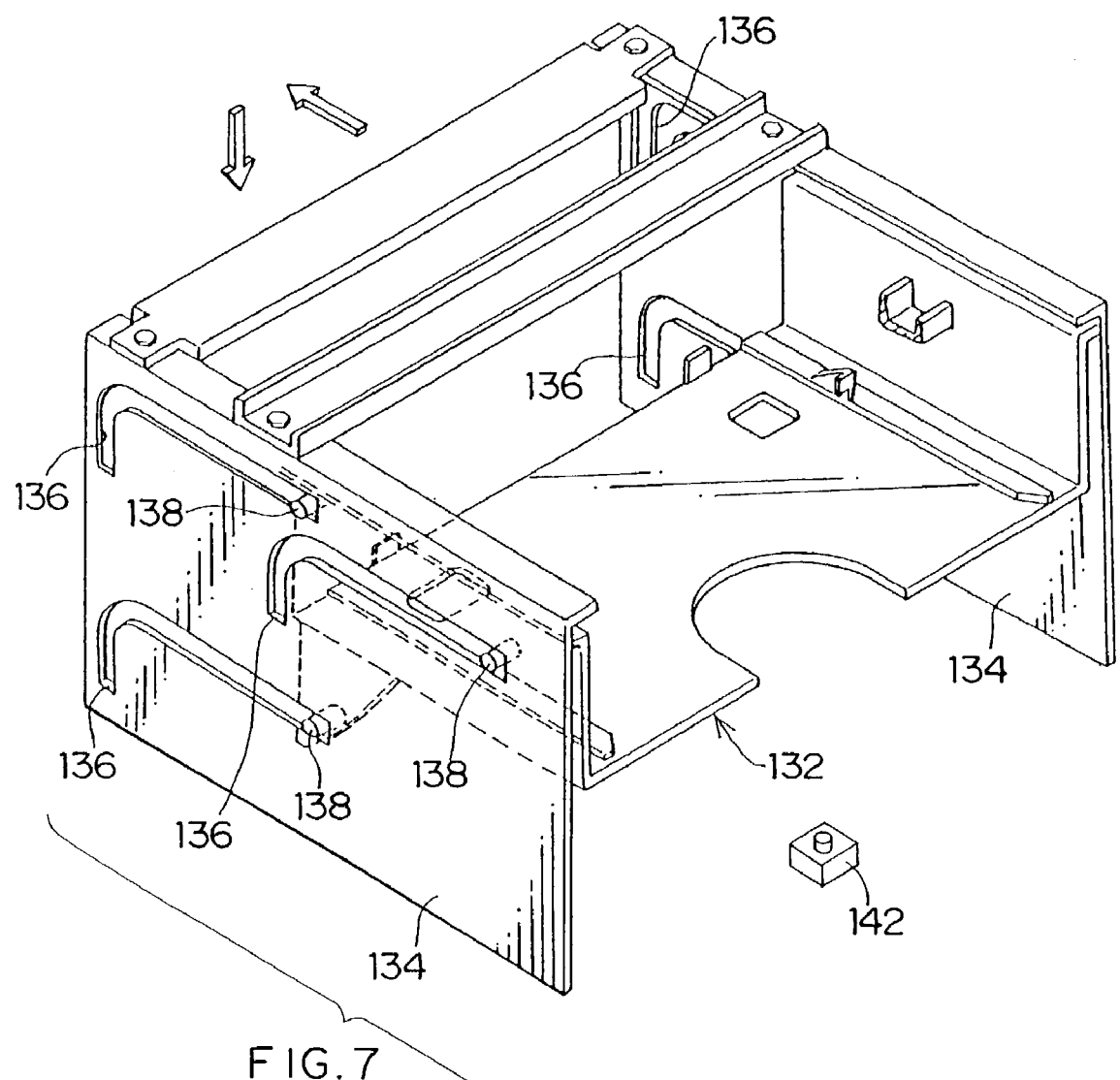
FIG. 7 is a schematic perspective view of a bucket of a drive device.

Next, a bucket 132 of the drive device 130 in which the magnetic tape cartridge 10 is loaded will be described. As shown in FIG. 7, three guide holes 136, each of which has a substantially L-shaped configuration as seen in side view, are provided in each of left and right side walls 134. Guide pins 138, which project from both side end surfaces of the bucket 132, are inserted in and supported at the guide holes 136 such that the bucket 132 is movable along the guide holes 136. The reading/writing device 142 is disposed at a predetermined position further downward than the bucket 132. The reading/writing device 142 reads, in a non-contact manner, the various information stored on the memory board 14, and writes, in a non-contact manner, new information as needed.

Accordingly, when the magnetic tape cartridge 10 is inserted from the loading opening 131 of the drive device 130 and is placed on the bucket 132, the bucket 132, while being guided by the guide holes 136, first moves horizontally, and then is lowered in the vertical direction. The reel gear 48 (see FIG. 8) meshes with a driving gear (not shown) of the drive device 130. Then, the reading/writing device 142 accesses the memory board 14 from the bottom surface 31 side of the magnetic tape cartridge 10, and reads the information stored on the memory board 14, and depending on the case, writes new information on the memory board 14.

Next, the series of operations of the magnetic tape cartridge 10, the library 100, and the drive device 130 (the bucket 132), which are structured as described above, will be described. When the magnetic tape cartridge 10 is not in use (i.e., when the magnetic tape cartridge 10 is not loaded in the drive device 130), the opening 18 is closed by the shutter member 60. The upper end portion 52 and the lower end portion 54 of the leader pin 50 are anchored on the engagement portions 26, 36 provided at the inner surfaces of the upper case 20 and the lower case 30, such that the leader pin 50 is held at the inner side of the opening 18.

The memory board 14 is mounted to the inclined surface of the block 80 which is inclined at 45° with respect to the front-back direction (inclined at 45° as seen in side view). By inserting and loading the block 80 in, with the inclined surface thereof leading, from the open hole 70 formed in the rear walls 22B, 32B, the block 80 is mounted to the magnetic tape cartridge 10. Accordingly, when the magnetic tape cartridge 10 is being disposed of or the like, if the ability to recycle the magnetic tape cartridge 10 is considered, the memory board 14 can be easily removed by being removed from the block 80. Therefore, the memory board 14 can easily be reused. Further, when it is desired to merely replace the memory board 14, it suffices to replace the block 80. Therefore, handling is easy, and replacement is simple.

In the above-described state, the magnetic tape cartridges 10 are accommodated in the respective accommodating portions 101 of the library 100. Then, the reading device 140 which is provided at the robot hand 120 accesses the memory boards 14 from the rear surface (rear walls 22B, 32B) sides of the magnetic tape cartridges 10, and reads the various information such as the recording capacity and the like stored thereon, and transmits this information to the control device. In this way, the drive devices 130 which are optimal for the respective magnetic tape cartridges 10 (the drive devices 130 at which the respective magnetic tape cartridges 10 can be recorded and played back) are recognized in advance by the control device. The magnetic tape cartridges 10 are efficiently loaded into the loading openings 131 of the respective drive devices 130 by the grasping means 102 provided with the robot hand 120.

When the magnetic tape cartridge 10 is loaded into the bucket 132 from the loading opening 131 of the drive device 130, the bucket 132 moves along the guide holes 136 and is lowered to a predetermined position. The driving gear and the reel gear 48 thereby mesh with one another. Further, due to the shutter member 60 engaging with an opening/closing member of the drive device 130, the shutter member 60 is moved rearward, and the opening 18 is opened. Then, the reading/writing device 142 provided at the drive device 130 accesses the memory board 14 from the bottom surface 31 side of the lower case 30, and reads the various information stored thereon, and, as needed, writes individual information thereon.

On the other hand, the pull-out member (not illustrated) of the drive device 130 enters into the magnetic tape cartridge 10, whose opening 18 has been opened, from the opening 18, and grasps the leader pin 50 and pulls the leader pin 50 out from the opening 18. The leader pin 50 which has been pulled out from the opening 18 is moved to the take-up reel (not illustrated) of the drive device 130, and is fit-into the reel hub (not illustrated) of the take-up reel, so that the magnetic tape 12 can be taken-up. Then, while the reel gear 48 is rotated via the driving gear and the take-up reel is rotated and takes-up the magnetic tape 12, recording of data onto the magnetic tape 12 or reading (playing back) of data recorded on the magnetic tape 12 is carried out.

When the magnetic tape cartridge 10 is to be removed from the drive device 130, the magnetic tape 12 is rewound onto the reel 40, and the leader pin 50 is pulled-out from the reel hub of the take-up reel and returned to within the case from the opening 18 of the magnetic tape cartridge 10. Then, the shutter member 60, at which the working of the opening/closing member is cancelled by the rising and discharging movements of the bucket 132, slides forward due to the urging force of the coil spring 64, and closes the opening 18. In this way, the magnetic tape cartridge 10, which has been discharged from the loading opening 131 of the drive device 130, is again grasped (nipped) by the robot hand 120, is conveyed to the library 100, and is accommodated in a predetermined accommodating portion 101.

As described above, in accordance with the present invention, the block to which the memory is mounted can be mounted to and removed from the case. Therefore, the memory can be easily mounted and removed by mounting and removing the block, without disassembling or destroying the case. Accordingly, the ability of the memory to be reused can be improved.

What is claimed is:

1. A recording tape cartridge accommodating a recording tape, and loaded into a drive device from a predetermined direction, said drive device capable of performing at least one of recording information onto the recording tape and reading information from the recording tape, said recording tape cartridge comprising:
    a case accommodating the recording tape in an interior of the case;
    a memory for recording one or more predetermined types of information, said memory being capable of communicating information between the memory and an exterior of the case; and
    a block holding the memory, said block being detachably mounted to the case,
    wherein said block is configured such that after assembly of the case, the block can be detached from the case without disassembling the case.

2. The recording tape cartridge of claim 1, wherein the predetermined types of information include at least one of a recording capacity and a recording format of the recording tape cartridge.

3. The recording tape cartridge of claim 1, wherein at least one of recording information onto the memory and reading information from the memory, are capable of being performed from an exterior of the cartridge.

4. The recording tape cartridge of claim 1, wherein the case has a rear end surface at a rear side with respect to the predetermined direction, and a bottom surface substantially orthogonal to the rear end surface, and the communication of information between the memory and the exterior is possible from a rear end surface side and a bottom surface side.

5. The recording tape cartridge of claim 1, wherein the memory is capable of communicating information with the exterior in a non-contact manner.

6. The recording tape cartridge of claim 1, wherein the memory is capable of communicating information with the exterior in a contacting manner.

7. A recording tape cartridge accommodating a recording tape, and loaded into a drive device from a predetermined direction, said drive device capable of performing at least one of recording information onto the recording tape and reading information from the recording tape, said recording tape cartridge comprising:
    a case accommodating the recording tape in an interior of the case;
    a memory for recording one or more predetermined types of information, said memory being capable of communicating information between the memory and an exterior of the case; and
    a block holding the memory, said block being detachably mounted to the case,
    wherein the case has an opening formed in an outer rear wall with respect to the predetermined direction, and the block is fit into and attached in the opening.
    wherein said block is configured such that after assembly of the case, the block can be detached from the case without disassembling the case.

8. The recording tape cartridge of claim 1, wherein the memory is a card-shaped memory board.

9. The recording tape cartridge of claim 4, wherein the memory has a surface which is suited to reading information from said surface.

10. The recording tape cartridge of claim 9, wherein the memory is held at the block such that said surface of the memory is inclined in a range of 30° to 60° with respect to the rear end surface and the bottom surface of the case.

11. The recording tape cartridge of claim 9, wherein the block has a surface which is inclined with respect to the rear end surface and the bottom surface of the case, and the memory is held on said surface of the block.

12. The recording tape cartridge of claim 9, wherein the memory is embedded and held within the block such that said surface of the memory is inclined with respect to the rear end surface and the bottom surface of the case.

13. A recording tape cartridge accommodating a recording tape, and loaded into a drive device from a predetermined direction, said drive device capable of performing at least one of recording information onto the recording tape and reading information from the recording tape, said recording tape cartridge comprising:
    a case accommodating the recording tape in an interior of the case;
    a memory for recording one or more predetermined types of information, said memory being capable of communicating information between the memory and an exterior of the case; and
    a block holding the memory, said block being detachably mounted to the case,
    wherein the block which is mounted to the case, has a portion which includes at least one surface exposed from the case, said exposed surface of the portion forming a substantially uniform surface with an outer surface of the case.

14. The recording tape cartridge of claim 13, wherein the block can be removed by a force being applied to the portion of the block in a direction of removing the block from the case.

15. The recording tape cartridge of claim 9, wherein the memory is held at the block such that said surface of the memory is inclined at an angle of 45° with respect to the rear end surface and the bottom surface of the case.

16. The recording tape cartridge of claim 1, wherein the block has a substantially triangular columnar shape.

17. The recording tape cartridge of claim 1, wherein the block has a substantially rectangular parallelepiped shape.

18. The recording tape cartridge of claim 11, wherein the surface includes a concave portion, and the memory is mounted in the concave portion.

19. The recording tape cartridge of claim 18, wherein the concave portion has a depth which is substantially the same as a thickness of the memory.

* * * * *